(12) United States Patent
Takao et al.

(10) Patent No.: US 7,632,477 B2
(45) Date of Patent: Dec. 15, 2009

(54) PROCESS FOR PREPARING ZIRCONIUM OXIDES AND ZIRCONIUM-BASED MIXED OXIDES

(75) Inventors: Yasuhide Takao, Shiizu (JP); Colin Norman, Swinton (GB); Gavin Edwards, Swinton (GB); Ian Chisem, Swinton (GB); Clare Jones, Swinton (GB)

(73) Assignee: Magnesium Elektron, Ltd., Manchester (GB)

( * ) Notice: Subject to any disclaimer, the term of this patent is extended or adjusted under 35 U.S.C. 154(b) by 413 days.

(21) Appl. No.: 10/554,949

(22) PCT Filed: Apr. 29, 2004

(86) PCT No.: PCT/GB2004/001840

§ 371 (c)(1),
(2), (4) Date: Jan. 26, 2006

(87) PCT Pub. No.: WO2004/096713

PCT Pub. Date: Nov. 11, 2004

(65) Prior Publication Data

US 2006/0120951 A1    Jun. 8, 2006

(30) Foreign Application Priority Data

Apr. 30, 2003   (GB) ................. 0309902.5

(51) Int. Cl.
   *C01F 17/00* (2006.01)
   *C01G 25/02* (2006.01)

(52) U.S. Cl. .............. 423/263; 423/326; 423/327.1; 423/594.1; 423/594.2; 423/594.3; 423/594.4; 423/594.5; 423/594.6; 423/595; 423/596; 423/598; 423/599; 423/600; 423/594.8; 423/594.9; 423/594.12; 423/608

(58) Field of Classification Search ......... 423/608, 423/263, 326, 327.1, 594.1, 594.2, 594.3, 423/594.4, 594.5, 594.6, 595, 596, 598, 599, 423/600, 594.8, 594.12
   See application file for complete search history.

(56) References Cited

U.S. PATENT DOCUMENTS

| | | | |
|---|---|---|---|
| 4,664,894 A | 5/1987 | Suzuki et al. | |
| 4,765,970 A * | 8/1988 | Kato | ............. 423/608 |
| 5,607,892 A | 3/1997 | Chopin et al. | |
| 5,723,101 A | 3/1998 | Cuif | |
| 5,747,401 A | 5/1998 | Cuif | |
| 5,840,268 A | 11/1998 | Ikegami et al. | |
| 5,898,014 A | 4/1999 | Wu et al. | |
| 6,037,305 A | 3/2000 | Cuif et al. | |
| 6,150,299 A | 11/2000 | Umemoto et al. | |
| 6,255,242 B1 | 7/2001 | Umemoto et al. | |
| 6,358,880 B1 | 3/2002 | Hedouin et al. | |
| 7,431,910 B2 | 10/2008 | Takao et al. | |
| 2002/0115563 A1 | 8/2002 | Blanchard et al. | |

FOREIGN PATENT DOCUMENTS

| | | |
|---|---|---|
| CA | 2 274 013 | 12/1997 |
| CN | 1130247 | 1/2001 |
| EP | 0 963 951 | 12/1999 |
| EP | 1 035 074 | 9/2000 |
| FR | 2 756 819 | 6/1998 |
| JP | 59-111922 | 6/1984 |
| JP | 8034613 A | 2/1996 |
| JP | 11-292539 | 10/1999 |
| WO | 87/07885 | 12/1987 |
| WO | 97/02213 | 1/1997 |
| WO | 98/16472 | 4/1998 |
| WO | 98/24726 | 6/1998 |
| WO | 99/24153 | 5/1999 |
| WO | 03037506 | 5/2003 |
| WO | 03037506 A | 5/2003 |

OTHER PUBLICATIONS

Search Report issued in GB0309902.5 dated Sep. 5, 2003.

* cited by examiner

*Primary Examiner*—Wayne Langel
*Assistant Examiner*—James Fiorito
(74) *Attorney, Agent, or Firm*—Pearne & Gordon LLP

(57) ABSTRACT

This invention relates to a process for preparing zirconium oxide, in its various forms, including zirconium-based mixed oxides. There is described a process for preparing a zirconium oxide in the absence of a cerium salt which comprises precipitating a zirconium hydroxide from an aqueous solution of a zirconium salt by reaction with an alkali in the presence of a controlled amount of sulphate anions at a temperature not greater than 50° C. and then calcining the hydroxide to form an oxide, wherein the oxide thus formed is essentially sulphate free. Catalysts and ceramics can be produced from the product oxides having improved thermal stability and improved sinterability, respectively. A particular use of the product oxide is as a promoter or catalyst support in automobile exhaust systems.

25 Claims, No Drawings

PROCESS FOR PREPARING ZIRCONIUM OXIDES AND ZIRCONIUM-BASED MIXED OXIDES

This application is a national stage application under 35 USC §371 of International Application No. PCT/GB2004/001840 having an International filing date of Apr. 29, 2004, which claims benefit under 35 USC §119 of GB 0309902.5 filed Apr. 30, 2003.

FIELD OF TECHNOLOGY

This invention relates to a process for preparing zirconium oxide, in its various forms, including zirconium-based mixed oxides. Collectively these oxides will be referred to as "zirconium oxides". Similarly references to "zirconium hydroxides" and "zirconium salts" include zirconium-based mixed hydroxides and zirconium-based mixed salts. The process of the present invention seeks to provide zirconium oxides which exhibit improved properties over those made by existing routes. These properties include higher thermal stability for applications such as catalysis and improved sintering behaviour for applications in ceramics. The changes in behaviour of the zirconium oxides are achieved through the modification and control of known processes.

DESCRIPTION

There are many applications for zirconium oxides in catalysis and ceramics. In many of these applications zirconium is doped with other metal oxides to form a solid solution and/or mixed oxide. The dopants that can be used include the alkaline earths, the rare earths, especially yttrium and lanthanum, the first row transition metals, silicon, aluminium, tin and lead. Doping is also described as stabilising or promoting, the terminology varies with the application area. The properties of the oxides that are required also vary from application to application.

In catalysis, in addition to the properties of the zirconium oxides that are required for the catalysis, it is important that they do not vary during use. A major cause of deterioration during use is high temperature which causes loss of surface area. Stability against such deterioration can be achieved through both the use of the above-mentioned dopants and also the improved processing of the present invention as described hereinafter.

A desirable zirconium-based oxide catalyst would have a surface area after sintering at 1000° C. of at least 40 m$^2$/g and a surface area after sintering at 1100° C. of at least 10 m$^2$/g.

In ceramics a desired property is the ability to sinter a shape made from a powder, by techniques such as slip casting pressing, injection moulding and tape casting, at a relatively low temperature, such as at least 50° C. and preferably 100° C. lower than those currently used for zirconium-based ceramics. This can be achieved by control of powder properties such as particle size, surface area and crystallite size. This invention describes hereinafter a process for controlling these variables. A desirable zirconium-based oxide ceramic would be successfully sinterable at not more than 1450° C. within 8 hours, and desirably within 2 hours, and preferably at not more than 1350° C. within 12 hours, and desirably within 8 hours.

Zirconium oxides are normally prepared by precipitation from aqueous solutions of the metal's salts by the addition of alkali or vice versa. However, this known process often produces gelatinous precipitates which are difficult to separate both from the mother liquor and from the various counter ions present. Furthermore during the drying and calcination of these precipitates agglomerates can be formed which are difficult to mill down to a powder suitable for processing.

In WO 03/037506 there is described a process—hereinafter referred to as "the earlier process"—for preparing zirconium-cerium-based mixed oxides which comprises reacting an alkali with an aqueous solution of a zirconium salt containing 0.42-0.7 mole of sulphate anion ($SO_4^{2-}$) per mole of zirconium cation at a temperature of not greater than 50° C., in the presence of a cerium salt to form a cerium-zirconium mixed hydroxide, and then calcining the cerium-zirconium mixed hydroxide to form a mixed oxide. It has now been found that the improvements to the mixed oxides achievable by the earlier process are not limited to only those oxides which contain cerium. The preferred features of the earlier process apply also to the process of this invention except where specifically mentioned. The content of WO 03/037506 is incorporated herein by reference.

Accordingly the present invention relates to a process for preparing a zirconium oxide in the absence of a cerium salt which comprises precipitating a zirconium hydroxide from an aqueous solution of a zirconium salt by reaction with an alkali in the presence of a controlled amount of sulphate anions at a temperature not greater than 50° C. and then calcining the hydroxide to form an oxide, wherein the oxide thus formed is essentially sulphate free. By "essentially sulphate free" is meant that the sulphate concentration in the calcined oxide is so small that it does not affect to any significant extent the desirable properties of the oxide in a catalyst or a ceramic application as described above. This low level of sulphate can be achieved in the present process without the need to include any special sulphate removal steps. Generally the $SO_4^{2-}$ concentration is 0.1% by weight or less, preferably 0.07% by weight or less, and more preferably 0.05% by weight or less.

The control of the temperature of precipitation allows the powder properties of the hydroxide to be modified as desired whilst maintaining the ease of processing by avoiding undesirable gelatinous precipitates. Generally the alkali is added to the zirconium salt. Control of the addition controls the precipitation, and the alkali, preferably sodium hydroxide, should desirably be added with stirring to raise the pH steadily and smoothly up to about pH 13. Desirably the zirconium hydroxide can be doped with one or more other metals (other than cerium) by the addition of at least one salt of the other metal(s) to the zirconium salt. Preferably the zirconium salt and at least one other metal salt should be readily soluble in water at the reaction temperature. Preferred salts are oxychlorides and nitrates. After calcination as described in the earlier process, the amount of zirconia in the product oxide can be in the range 30-100% by weight.

In order to optimise the properties of the product oxide formed by the process of the present invention it is important that the following parameters are controlled:

initial solution concentration measured as metal oxide—at least 5 weight %, preferably 10 to 20 weight %, and more preferably about 15 weight %, starting temperature—not more than 50° C. and for catalyst production, preferably less than 15° C., and more preferably less than 5° C., sulphate ratio—about 0.3/1 to 1.5/1 and preferably 0.45/1 to 1.25/1, alkali concentration and alkali addition rate—controlled together whilst stirring the reaction mixture to ensure homogeneity such that there is a smooth increase in pH with the addition of alkali.

By means of these controls the zirconium salt can be converted smoothly to its hydroxide through an intermediate hydroxide/sulphate complex without the undesirable formation of a gelatinous precipitate.

The addition of other salts which do not react to form a precipitate, eg sodium chloride, to the starting mixture can also improve the properties of the product oxide by acting as ionic strength modifiers in the reacting solution. Such additional salts can be present in an amount of up to the amount of the metal salts present.

After precipitation, other steps to produce the product oxide include washing, drying, hydrothermal treatment, and calcining and milling, either separately or in combination, as described in WO 03/037506.

Similarly as discussed in connection with the earlier process the powder properties that are of importance for the application of the products of the process of this invention are particle size and particle size distribution, pore size and pore size distribution, crystal phase purity, crystallite size, surface area and surface area stability, and sinterability.

Likewise the optional addition of hydrogen peroxide at the end of the precipitation step of the present process gives an improvement in sulphate removal by acting as a better ligand for sulphate ions than the metal hydroxide formed at the pH prevailing in the solution at this point in the process, which is generally about 13.

The present invention will now be described by way of example with reference to the following Examples.

EXAMPLE 1

A mixture of 1784 g of an aqueous solution of zirconium oxychloride (21.3 wt % $ZrO_2$), with a molar ratio (Cl/Zr) of 2, and 95.69 g of an aqueous solution of neodymium nitrate (20.9 wt % $Nd_2O_3$) was cooled to 4.3° C. Separately 599.87 g of DI (deionised) water and 187.06 g of a 77 wt % aqueous solution of sulphuric acid (corresponding to $SO_4^{2-}/Zr^{4+}=0.48/1$) were mixed and cooled to 4.3° C. The two cooled solution were mixed and then a 10 wt % aqueous solution of NaOH was added dropwise to the mixture with stirring. A white precipitate formed by the time when the pH reached approximately 1.5.

While continuing the stirring and maintaining the temperature of the reaction system at 40° C. or lower, the dropwise addition of the 10 wt % aqueous solution of NaOH was continued until the pH became approximately 8. At this point, a 30 wt % aqueous solution of NaOH was substituted for the 10 wt % aqueous solution of NaOH and the dropwise addition was continued with stirring until the pH became approximately 13. Thereafter the stirring was continued at this pH for another one hour.

The precipitate thus obtained was collected by filtration and washed with 12 liters of deionised water at 60° C. to give a washed cake of zirconium-neodymium mixed hydroxide.

The washed cake was dried and then calcined at 700° C. for 4 hours and allowed to cool to room temperature to give 400 g of zirconium-neodymium based mixed oxide powder. The sulphate content of the product oxide was less than 0.05% by weight.

EXAMPLE 2

A mixture of 51.64 kg of an aqueous solution of zirconium oxychloride (19.8 wt % $ZrO_2$), with a molar ratio (Cl/Zr) of 2, and 8.38 kg of an aqueous solution of neodymium nitrate (21.2 wt % $Nd_2O_3$) was cooled to 2.0° C. Separately 14.95 kg of deionised water and 5.03 kg of a 77 wt % aqueous solution of sulphuric acid (corresponding to $SO_4^{2-}/Zr^{4+}=0.48/1$) were mixed and cooled to 1.4° C. The two cooled solutions were mixed and then a 10 wt % aqueous solution of NaOH was added dropwise to the mixture with stirring. A white precipitate formed by the time when the pH reached approximately 1.5.

While continuing the stirring and maintaining the temperature of the reaction system at 40° C. or lower, the dropwise addition of the 10 wt % aqueous solution of NaOH was continued until the pH became approximately 8. At this point, a 28 wt % aqueous solution of NaOH was substituted for the 10 wt % aqueous solution of NaOH and the dropwise addition was continued with stirring until the pH became approximately 13. Thereafter the stirring was continued at this pH for another one hour.

The precipitate thus obtained was collected by filtration and washed to give a washed cake of zirconium-neodymium mixed hydroxide.

The washed cake was dried and then calcined at 850° C. for 2 hours and allowed to cool to room temperature to give 12 kg of zirconium-neodymium based mixed oxide powder. Analysis of the $SO_4$ level of the powder gave a value of <0.01% by weight.

To examine the thermal stability of the zirconium-neodymium based mixed oxide thus obtained, a sample which had been calcined at 850° C. for 2 hours was submitted to further heat treatment (a) at 1000° C. for 2 hours and then (b) 1100° C. for 2 hours. The BET surface areas were determined, as specified by JIS R 1626, to be (a) 54 $m^2/g$ and (b) 21 $m^2/g$ respectively.

EXAMPLE 3

A mixture of 2836 g of an aqueous solution of zirconium oxychloride (19.7 wt % $ZrO_2$), with a molar ratio (Cl/Zr) of 2, and 171.81 g of an aqueous solution of yttrium nitrate (18.2 wt % $Y_2O_3$) was prepared. Separately 352.3 g of DI water and 573.01 g of a 77 wt % aqueous solution of sulphuric acid (corresponding to $SO_4^{2-}/Zr^{4+}=1/1$) were mixed. The two solutions were mixed and placed in a water bath at 45° C. for 1 hr and then a 10 wt % aqueous solution of NaOH was added dropwise to the mixture with stirring. A white precipitate formed.

While continuing the stirring the dropwise addition of the 10 wt % aqueous solution of NaOH was continued until the pH became approximately 8. At this point, a 28 wt % aqueous solution of NaOH was substituted for the 10 wt % aqueous solution of NaOH and the dropwise addition was continued with stirring until the pH became approximately 13. Thereafter the stirring was continued at this pH for another one hour.

The precipitate thus obtained was collected by filtration and washed with 12 liters of deionised water at 60° C. to give a washed cake of zirconium-yttrium mixed hydroxide.

The washed cake was dried and then calcined at 700° C. for 4 hours and allowed to cool to room temperature to give 400 g of zirconium-yttrium based mixed oxide powder.

The sulphate content of the powder was less than 0.05% by weight.

EXAMPLE 4

Example 3 was repeated and a further sample of precipitate formed. The precipitate thus obtained was collected by filtration and washed to give a washed cake of zirconium-yttrium mixed hydroxide.

The washed cake was dried and then calcined at 925° C. for 8 hours and allowed to cool to room temperature to give 590 g of zirconium-yttrium based mixed oxide powder.

To examine the sinterability of the zirconium-yttrium based mixed oxide thus obtained, a sample which had been calcined at 925° C. for 8 hours was submitted to bead milling and then spray drying to obtain granules. Test pieces prepared by pressing the granules (uniaxial press/5 g powder (2.5 cm diameter, 2.0 te and 4.6 te) were sintered at 1350° C. for 8 hours and 1400° C. for 8 hours, and the densities (gcm$^{-3}$) of the sintered test pieces are set out in the table below.

| Press Pressure | Firing Temperature | |
| --- | --- | --- |
|  | 1350° C. | 1400° C. |
| 2.0te | 6.03 | 6.07 |
| 4.6te | 6.03 | 6.07 |

COMPARATIVE EXAMPLE 1

An attempt was made to prepare a zirconium-neodymium based mixed oxide by dropwise addition of a 10 wt % aqueous solution of NaOH to a mixture of aqueous zirconium oxychloride, aqueous neodymium nitrate, deionises water and aqueous sulphuric acid as in Example 2, except using 709.0 g of deionised water and 78.0 g of the 77 wt % aqueous sulphuric acid (corresponding to $SO_4^{2-}/Zr^{4+}=0.20/1$).

The results are as follows: the precipitate formed was gel-like and was extremely difficult to filter and wash, and the target zirconium-neodymium based mixed oxide could not be prepared as the material contained separate pure monoclinic zirconia.

The thermal stability of this zirconium-neodymium based mixed oxide, a sample which had been calcined at 850° C. for 2 hours was submitted to further heat treatment at (a) 1000° C. for 2 hours and then (b) 1100° C. for 2 hours. The BET surface areas were determined, as specified by JIS R 1626, to be (a) 32 m$^2$/g and (b) 7.7 m$^2$/g, respectively.

COMPARATIVE EXAMPLE 2

An attempt was made to prepare a zirconium-neodymium based mixed oxide by dropwise addition of a 10 wt % aqueous solution of NaOH to a mixture of aqueous zirconium oxychloride, aqueous neodymium nitrate, deionises water and aqueous sulphuric acid as in Example 1 except using 7.0 g of deionised water and 780.0 g of the 77 wt % aqueous sulphuric acid (corresponding to $SO_4^{2-}/Zr^{4+}=2.0/1$).

The zirconium-neodymium based mixed oxide obtained after the heat treatment (a) at 1000° C. for 2 hours and then (b) at 1100° C. for 2 hours showed worse BET surface areas (JIS R 1626) of (a) 24 m$^2$/g and (b) 6.1 m$^2$/g, respectively. The target zirconium-neodymium based mixed oxide could not be prepared as the material contained separate pure monoclinic zirconia.

COMPARATIVE EXAMPLE 3

An attempt was made to prepare a zirconium-neodymium based mixed oxide as in Example 1 using the same reactants except that the mixture of aqueous zirconium oxychloride and aqueous neodymium nitrate were heated up to 55° C., and separately the mixture of deionised water and aqueous sulphuric acid was heated up to 55° C.

The zirconium-neodymium based mixed oxide obtained after the heat treatment of the resulting oxide (a) at 1000° C. for 2 hours and then (b) at 1100° C. for 2 hours showed worse BET surface areas (JIS R 1626) of (a) 31 m$^2$/g and (b) 4.9 m$^2$/g, respectively.

COMPARATIVE EXAMPLE 4

An attempt was made to prepare a zirconium-neodymium based mixed oxide as in Example 1 except stopping the dropwise addition of 30% aqueous solution of NaOH at a pH of approximately 10 instead of 13.

The SO$_4$ level determined on the specimen obtained after calcining at 850° C. for 2 hours was 6.4% by weight.

The invention claimed is:

1. A process for preparing a zirconium oxide in the absence of a cerium salt which comprises forming an aqueous solution of a zirconium salt and sulfate anions in a ratio of $SO_4^{2-}/Zr^{4+}$ ions of from 0.3/1 to 1.5/1, cerium salt being absent in said aqueous solution, maintaining said aqueous solution at a temperature not greater than 50° C. and precipitating only a single precipitate from said aqueous solution, said single precipitate being a zirconium hydroxide formed by reaction of said aqueous solution with an alkali at said temperature and then calcining said single precipitate of said zirconium hydroxide to form zirconium oxide, whereby the zirconium oxide thus formed is essentially sulfate free.

2. A process as claimed in claim 1 wherein the $SO_4^{2-}$ concentration of the zirconium oxide formed is 0.1% by weight or less.

3. A process as claimed in claim 2 wherein the $SO_4^{2-}$ concentration of the zirconium oxide formed is 0.07% by weight or less.

4. A process as claimed in claim 3 wherein the $SO_4^{2-}$ concentration of the zirconium oxide formed is 0.05% by weight or less.

5. A process as claimed in claim 1 when the alkali is added dropwise with stirring over time to raise the pH up to about pH 13.

6. A process as claimed in claim 1 wherein the alkali is sodium hydroxide.

7. A process as claimed in claim 1 wherein the aqueous solution includes a salt of a metal selected from the group consisting of alkaline earths, rare earths, the first row transition metals, silicon, aluminum, tin, lead and combinations thereof.

8. A process as claimed in claim 7 wherein the transition metal is yttrium or lanthanum.

9. A process as claimed in claim 1 wherein the aqueous solution contains a salt which does not react with any other component.

10. A process as claimed in claim 9 wherein said salt is sodium chloride.

11. A process as claimed in claim 1 wherein the amount of zirconia in the product oxide is in the range of 30 to 100% by weight.

12. A process as claimed in claim 1 in which the total concentration of zirconium and any of said metals present in the aqueous solution measured as their respective oxides is at least 5 weight %.

13. A process as claimed in claim 12 wherein said concentration is 10 to 20 weight %.

14. A process as claimed in claim 13 wherein said concentration is 15 weight %.

15. A process as claimed in claim 1 wherein said temperature of said aqueous solution is less than 15° C.

16. A process as claimed in claim 1 wherein said temperature of said aqueous solution is less than 5° C.

17. A process as claimed in claim 1 wherein the ratio of ions $SO_4^{2-}/Zr^{4+}$ is 0.45/1 to 1.25/1.

18. A process as claimed in claim 1 including the step of adding hydrogen peroxide during or at the end of the precipitation step.

19. A process as claimed in claim 1 wherein the zirconium oxide produced has a surface area after sintering at 1000° C. of at least 40 m²/g and a surface area after sintering at 1100° C. of at least 10 m²/g.

20. A process as claimed in claim 1 wherein the zirconium oxide produced is sinterable at not more than 1450° C. within 8 hours.

21. A process as claimed in claim 20 wherein the zirconium oxide product is sinterable at not more than 1350° C. within 8 hours.

22. A process as claimed in claim 1 including the step of a hydrothermal treatment of the zirconium hydroxide before calcination.

23. A process as claimed in claim 1 including the step of drying the zirconium hydroxide before calcination.

24. A process as claimed in claim 23 when the drying is effected by spray drying.

25. A process as claimed in claim 1 wherein no gelatinous precipitate is formed during formation of said zirconium hydroxide.

* * * * *

UNITED STATES PATENT AND TRADEMARK OFFICE
CERTIFICATE OF CORRECTION

PATENT NO. : 7,632,477 B2
APPLICATION NO. : 10/554949
DATED : December 15, 2009
INVENTOR(S) : Takao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Second Day of November, 2010

David J. Kappos
*Director of the United States Patent and Trademark Office*